United States Patent [19]
Bannon et al.

[11] Patent Number: 6,047,357
[45] Date of Patent: Apr. 4, 2000

[54] HIGH SPEED METHOD FOR MAINTAINING CACHE COHERENCY IN A MULTI-LEVEL, SET ASSOCIATIVE CACHE HIERARCHY

[75] Inventors: Peter J. Bannon, Concord, Mass.; Elizabeth M. Cooper, Menlo Park, Calif.

[73] Assignee: Digital Equipment Corporation, Maynard, Mass.

[21] Appl. No.: 08/379,048

[22] Filed: Jan. 27, 1995

[51] Int. Cl.[7] ................................................ G06F 12/12
[52] U.S. Cl. .................... 711/133; 711/122; 711/124; 711/138; 711/142; 711/143
[58] Field of Search .................... 395/455, 456, 395/449; 711/124, 133, 122, 138, 142, 143

[56] References Cited

U.S. PATENT DOCUMENTS

| | | |
|---|---|---|
| 4,173,781 | 11/1979 | Cencier ................................. 395/775 |
| 4,442,487 | 4/1984 | Fletcher et al. ......................... 395/449 |
| 4,464,712 | 8/1984 | Fletcher ................................. 395/449 |
| 4,831,622 | 5/1989 | Porter et al. ......................... 395/182.03 |
| 5,136,700 | 8/1992 | Thacker ................................. 395/449 |
| 5,355,467 | 10/1994 | MacWilliams et al. ................. 395/473 |
| 5,551,001 | 8/1996 | Cohen et al. ........................... 395/449 |

*Primary Examiner*—Eddie P. Chan
*Assistant Examiner*—Hong C. Kim
*Attorney, Agent, or Firm*—Christopher J. Cianciolo; Lindsay McGuinness

[57] ABSTRACT

A cache memory system includes multiple cache levels arranged in a hierarchical fashion. A data item stored in a higher level cache level is also stored in all lower level caches. The most recent version of a data item is detected during an initial lookup of a higher level cache. The initial lookup of a higher level cache includes a comparison of address bits for the next lower level cache. Thus the most recent version of a data item is able to be detected without additional lookups to the lower level cache.

5 Claims, 6 Drawing Sheets

HIGH SPEED METHOD FOR MAINTAINING CACHE COHERENCY IN A MULTI-LEVEL, SET ASSOCIATIVE CACHE HIERARCHY

BACKGROUND OF THE INVENTION

This invention relates generally to computer systems and more particularly to computer systems having central processing units (CPUs) employing multiple level cache memories.

As is known in the art, computer systems generally include at least one central processing unit and a memory interconnected by a system bus. In a typical computer system implementation, instructions and data are stored in the same memory. The processor fetches instructions from the memory and executes operations on data as specified by the fetched instructions. As the speed of processors has increased, a need has arisen to find ways to more suitably match the access time of the main computer memory to the computational speed of the processor.

One known way of accomplishing this is through the use of cache memory. As is known in the art, cache memory typically includes a small, high-speed buffer memory used to temporarily hold those portions of the contents of main memory most likely to be used by the CPU in the near future. Since cache memory typically has a much faster access time than main memory, a CPU with a cache memory system spends much less time waiting for instructions and operands to be fetched and/or stored. In multi-processor computer systems, each CPU is typically provided with its own cache or cache system.

A cache memory contains a subset of the information stored in main memory and typically resides on the data path between the processing unit and the system bus. The system bus is used by the CPU to communicate with the main memory as well as other processors in a computer system. When a processor attempts to access a main memory location whose contents (data) have been copied to the cache, no access to main memory is required in order to provide the requested data to the CPU. The required data will be supplied from the cache as long as the data contained in the cache is valid. Since access to the cache is faster than access to main memory the processor can resume operations more quickly. The event where requested data is found in the cache is commonly referred to as a "cache hit".

On the other hand, when the processor attempts to access a main memory location that has not had its contents copied to the cache or a cache location which includes invalid data, a main memory access is initiated by the CPU to obtain the desired data. This event is commonly referred to as a "cache miss". As the result of a cache miss, a main memory access occurs and the data read from main memory is sent to both the processor and to the cache so that subsequent attempts to access the same memory location will result in cache hits. In this way, the effective memory access time for the processor is reduced to a value somewhere between the fast access time of the cache memory and the slower access time of main memory.

One way in which caches are categorized is by the manner in which data placed in a cache is updated to main memory or another cache. This is also commonly referred to as the update protocol. Generally, caches fall into two categories of update protocol. The first category of caches are so called "write-through" caches. With a write-through cache, data is copied to main memory or the next level cache at the same time or very soon after it is written to the cache. The second category of caches are so called "write-back" caches. With a write-back cache, data placed in the cache is not immediately copied to main memory or next level cache.

Although the use of write-back caches typically results in a faster memory system, there is generally an increased complexity in the memory design in order to maintain cache coherency. Since modified data in a write-back cache is not immediately copied to main memory or other cache memory, there is potential for other processors of a multi-processor system to use an older version of a data item. Maintaining cache coherency involves ensuring that all processor always use the most recent version of data from a cache or main memory.

Maintaining cache coherence is of particular concern in a multi-processor systems. This problem arises since the value stored in a single cache memory location might, at one time, be replicated in the local cache memory of any or all of the processors. If each local cache memory employs a write-back policy (i.e. writing modified data back to a local cache and not main memory), the system must somehow ensure that when one processor modifies the value of a memory location and writes that modification only to its own local cache memory, then the copies of that memory location in any of the other local caches should reflect the change made by that one processor. Additionally, at some point, the modified data must be copied back to the main memory. In a write-back cache design, the modified data is known as dirty data.

In order to balance cache speed and size, it is useful to provide more than one level of write-back cache in a computer system. With such a system, it is possible for modified copies of data to exist in each cache level. Thus, the problem of maintaining cache coherency is exacerbated with processor designs where each processor uses multiple levels of cache to implement a cache system.

Although prior art systems have employed processors with multiple level caches, the problem of maintaining coherency between multiple cache levels has been avoided through the use of direct mapped write-through caches. Using direct mapped write-through caches at the first level ensures that the most recent version of data can be found by looking in one place. However, using a write-back cache as the first level cache memory required prior art systems to check each level of write-back cache to determine which cache entry held the appropriate data. The necessity of searching each level of cache for the correct version of data consumes additional time and requires added complexity to the overall cache design.

It would be advantageous to provide a computer system which employs write-back caches to be able to locate the most recent copy of write-back cache data in a simplified manner that does not consume additional time during accesses to the cache.

SUMMARY OF THE INVENTION

In accordance with the present invention, a cache memory system includes a plurality of cache memories. Each cache includes a plurality of addressable storage locations for storing data. The caches are arranged in a hierarchical fashion. That is, a first cache is smaller in capacity than a second cache which is in turn smaller in capacity than a third cache. The cache system also adheres to a subset rule which requires that a data item stored in the first cache will also be stored in the second and third caches.

The cache system further includes means for determining which of the plurality of cache memories contains the most recent version of a data item. The means for finding the most recent version of a data item does not require a lookup to each cache memory. The cache memory system also includes means for placing the most recent version of data found amongst the cache memories into the main memory before replacing that data item with another data item.

With such an arrangement, the most recent versions of a data item can be found in a simple manner without adding extra processing time in the form of additional cache lookups. Additionally, this arrangement provides for a reduction in the complexity of hardware required to implement a cache memory system.

BRIEF DESCRIPTION OF THE DRAWINGS

The above-mentioned and other features of the invention will now become more apparent by reference to the following description taken in connection with the accompanying drawings in which.

DETAILED DESCRIPTION OF THE PREFERRED EMBODIMENT

Figure 1:
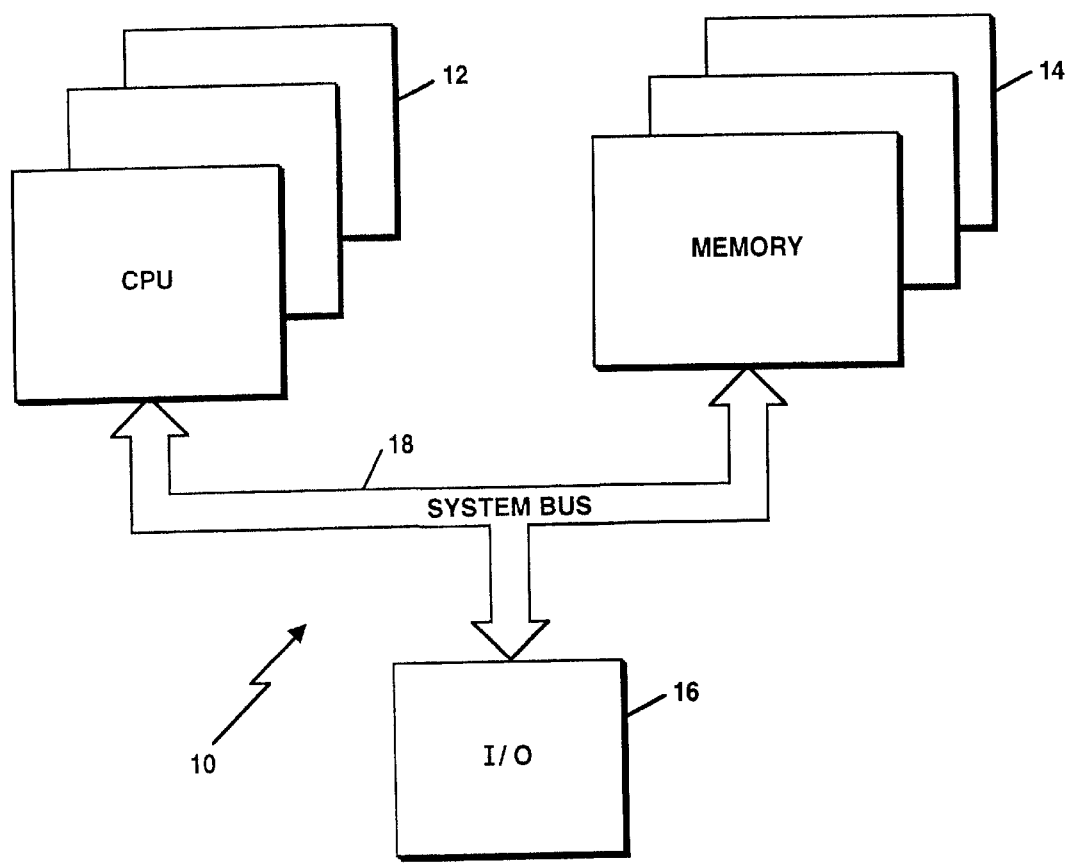
FIG. 1 is a block diagram of a computer system which may employ the present invention.

Turning now to the drawings and referring first to FIG. 1, there is shown a computer system 10 which may embody the invention. The system may include inter alia, computer processor units (CPUs) 12, memory 14 and input/output (I/O) subsystem 16 all interconnected for communication by system bus 18. Like most present day computer systems, computer system 10 operates in accordance with instructions which are read from memory 14 via bus 18 and executed by CPUs 12. Additionally, CPUs 12 communicate with each other and the I/O subsystems via system bus 18.

Both data and instructions for processing the data may be stored in addressable storage locations within the memory 14. In order to increase the overall speed at which computer system 10 operates, CPUs 12 often include or employ cache systems as a means of storing frequently used data and instructions. The caches of the cache system are typically located physically close to the instruction units and execution units of the CPUs 12. By providing CPUs 12 with access to memory which is physically nearer the CPUs than main memory, less time is needed to retrieve the instructions and data necessary for operation and thus an overall faster computer system can be achieved.

Figure 2:
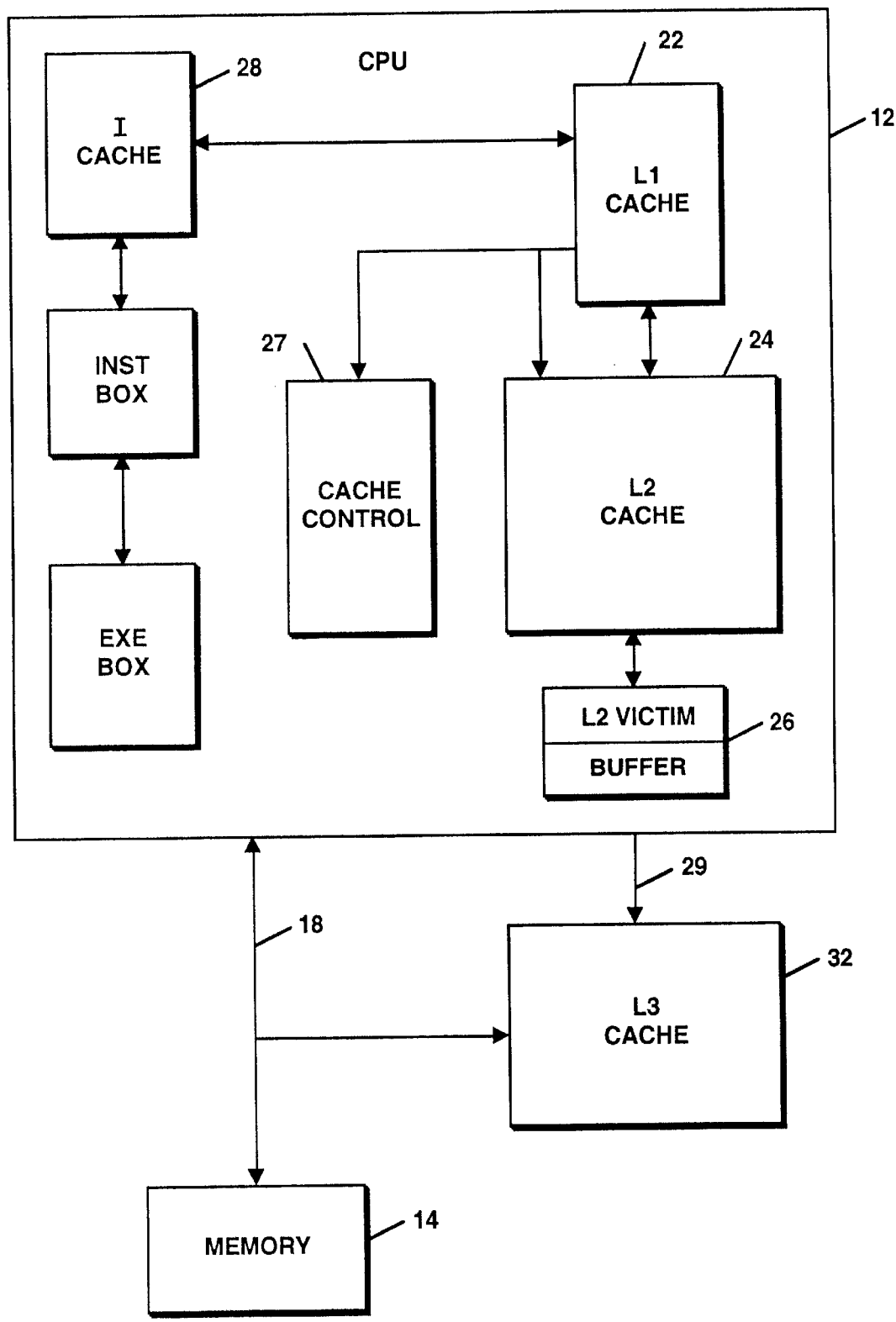
FIG. 2 is detailed block diagram of a one of the CPUs of the computer system of FIG. 1, including an associated cache memory system.

Referring now to FIG. 2, an exemplary one of CPUs 12 is shown. The CPUs may all be the same and preferably, CPU 12 includes a multi-level cache memory comprising a level 1 cache (L1) 22, a level 2 cache (L2) 24, an instruction cache (I-cache) 28, as well as victim buffer 26 and cache controller 27. According to a preferred embodiment, the L1 cache 22, L2 cache 24, and I-cache 28, as well as victim buffer 26 and cache controller 27 may be physically located within an integrated circuit that comprise CPU 12. As such, data and instructions stored in the individual caches may be quickly retrieved and used by the instruction units and execution units of CPU 12.

In the present embodiment of the invention, the L1 cache may be designed to have up to 256 entries each storing 32 bytes of data (an 8 k cache). The L2 cache may be designed to store up to 1536 entries each having a length of 64 bytes (a 96 k cache). In addition to the L1 cache and the L2 cache, CPU 12 may also be coupled to an external level 3 (L3) cache 32 via a bus 29. However, it should be noted that the L3 cache may well be incorporated into the integrated circuitry of CPU 12, depending on its size and the physical constraints of the CPU design. The L3 cache 32 may be designed to store 65,000+ entries each having a length of 64 bytes. This translates into an L3 cache size of approximately 4 megabytes.

The three caches associated with CPU 12, i.e. L1 cache 22, L2 cache 24 and L3 cache 32 may be arranged in a so-called hierarchical fashion. That is, the L1 cache 22 may be a small cache having a small number of storage locations and would normally be located physically closest to the instruction unit of the CPU 12. The L2 cache 24 may have slightly larger storage capacity and be further removed from the instruction unit of the CPU while the L3 cache 32 may be larger still than either the L1 or the L2 cache and be further removed from CPU 12.

During operation, when CPU 12 needs an instruction or item of data, rather than initiate an external access and seek the data in memory 14, the CPU will first look for the instruction or data in the L1 cache 22 which, as described above, is closest to the instruction unit thus providing faster access. If the instruction or data is not found in the L1 cache 22, the CPU next looks to the L2 cache 24. Since the L2 cache 24 may be larger than the L1 cache 22, the probability of finding the instruction or data in the L2 cache 24 becomes greater. If the instruction or data is not found in the L2 cache 24, the CPU then looks to the L3 cache 32. It follows then that since the L3 cache 32 may be larger still than the L2 cache 24 the probability of finding the instruction or data in the L3 cache is greater than finding it in the L2 cache. Finally, if the instruction or data is not found in the L3 cache 32, the CPU will generate an external access through interface 34 and retrieve the data from memory 14. This would be accomplished by asserting an address on bus 18 to distinctly identify a particular location in memory 14 and thereby retrieve the data stored at that particular address from memory 14.

Caches are generally categorized by the mapping process followed to transform data from main memory addresses to cache memory entries. The three most widely used mapping procedures are so called "associative mapping", "direct mapping", and "set-associative mapping". Many techniques in the art exist for allowing cache memory look-ups to be as fast and efficient as possible. The exact technique employed depends upon the particular implementation of the cache itself, especially the process used to map cache addresses to main memory addresses.

Typically, to map addresses, a structure called a "tag directory" or "tag store" is provided to enable swift cache look-ups. A tag store is a table of multiple entries, each entry corresponding to a block of a cache memory. Traditionally, a cache block contains a copy of several main memory words, and all access to the cache is performed in units of this basic cache block size. Each tag store entry contains enough bits to specify any one of the cache blocks in the cache. When a block of data from main memory is mapped into a cache block, the tag store entry corresponding to that cache block is loaded with the higher order bits used to address of the data block in main memory.

In so called "fully associative" cache designs the associative memory stores both the address and the data of the main memory word. When the processor searches the cache looking for a desired main memory location, it compares the desired address to the entries in the tag store. If a match is found, the corresponding word is selected from within the multiple word cache block.

In a so called "direct mapped" cache design, the least significant bits of the address of interest are used as an index into the tag store. The remaining higher order bits of the address are then compared with the tag store entries to determine a cache hit or miss.

In a so called "set-associative" cache design, the least significant bits of the address of interest are used as an index into a small number (e.g. 2 or 4) of locations within the tag store. The tag values of indexed entries are extracted and a comparison is performed, in parallel, on each of this limited number of entries to determine a cache hit.

A further enhancement that is useful for decreasing the average memory access time for a CPU module is to organize the cache memory in a multi-level hierarchical structure. A hierarchical structure includes placing the smallest and fastest primary cache memory closest to the CPU while increasingly slower and larger secondary cache memories are positioned further along the data path between the CPU and main memory. Such a configuration represents a compromise between the high cost of very fast memory devices and the slower access times of relatively lower cost memory devices. A cache miss in the fastest and smallest primary cache memory causes the CPU to access the second level cache memory in the hierarchy where the larger size suggests an even greater probability of a cache hit. A cache miss in the secondary cache causes the CPU to access the next cache memory even lower in the hierarchy, and so on, until such time as a cache hit occurs in some level of the cache structure, or a main memory access is initiated.

In addition to employing a hierarchical design, in the preferred embodiment of the present invention, the cache system adheres to what is known as a "subset rule". The subset rule requires that every address which is represented in the L1 cache 22 should also be represented in the L2 cache 24, and every address which is represented in the L2 cache 24, should also be represented in the L3 cache 32. And of course, the memory 14 represents all available addressable memory locations. Normally, it is expected that each address represented in each level cache should store the same data, but as will be described below, that is not always necessarily the case and the subset rule still remains in force.

In addition to the subset rule, each cache preferably operates in accordance with a predetermined update policy. For example, in the preferred embodiment, the L1 cache 22 may be a so-called write-through type cache. That is, any time an entry is made into the L1 cache 22, the entry is also copied ("written through") to the L2 cache 24. The L2 cache 22, on the other hand, may adhere to what is known as a write-back update policy. With a write-back update policy, data entered into the L2 cache 22 is not immediately copied to the larger memory stores (e.g. the L3 cache 32 and memory 14). It is only copied to the next level of memory when a read or write cause a miss in the L2 cache. Data stored in a write-back cache is marked "dirty" when it is known that the contents of the data have changed but the lower (larger) level memories have not yet received the new data. Therefore, if the CPU 12 attempts to write new data to a cache location which is marked dirty, the CPU will be prevented from overwriting the dirty data until the data is copied to the lower level memories.

In addition to following different update protocols, each cache may be one of several different well known types of caches depending on the mapping scheme used to translate main memory address into cache addresses. For example, the L1 cache 22 of the present embodiment may be a so-called direct mapped cache. The L2 cache 24 may be a so-called multiple set or set associative type cache, while the L3 cache 32 may be a direct mapped cache similar to the L1 cache 22. The names of the respective caches refers to the techniques used for performing data lookups into the individual caches. That is, there is a mapping process which is followed to transform data from main memory to locations in cache memory.

Typically, to map addresses, a structure called a tag directory or tag store, is provided with each cache to enable swift cache lookups. A tag store is a table of multiple entries where each entry corresponds to a block of a cache memory. Typically, a cache block contains several main memory words and all access to the cache is performed in units of this basic cache block size. When a block of data from main memory is mapped into a cache block, the tag store entry corresponding to that cache block is loaded with the higher order bits of the address of the data block in main memory. The remaining lower order bits are used to index a particular location in the cache and to select a particular word (or byte) within the indexed cache block.

Figure 3:
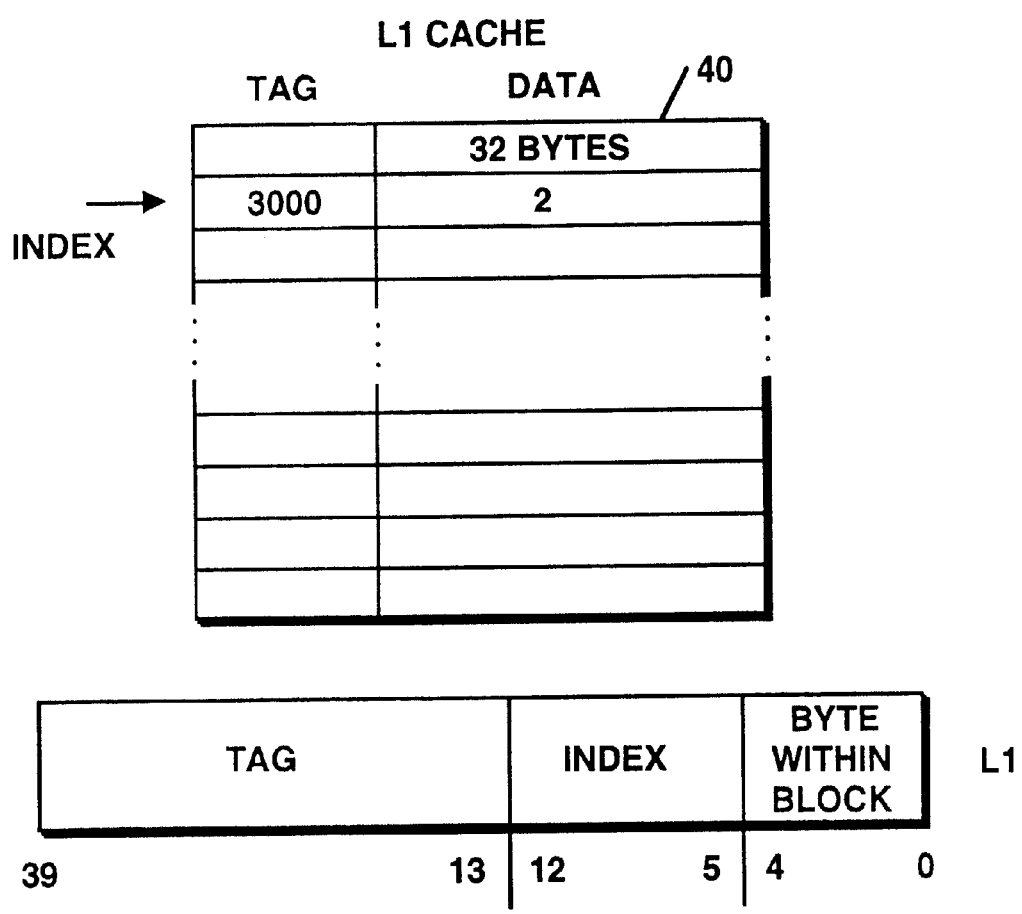
FIG. 3 is representation of a data structure of a first level cache (L1) of the CPU in FIG. 2.

Referring now to FIG. 3, the L1 cache 22 is shown being represented by data structure 40 which may be implemented in the integrated circuitry of CPU 12. Data structure 40 represents a manner in which to organize the data associated with a so-called direct mapped cache design such as the L1 cache. With a direct mapped cache, a predetermined number of lower order bits of the address of interest (i.e., addresses asserted on the bus) may be used as an index into the tag store. However, as discussed below, the present invention may actually use a portion of the least significant bits to indicate a particular byte of data within a cache entry.

Also shown in FIG. 3 is a representation of an address asserted on the system bus and the associated bit groupings used to access the data structure 40. As shown, the present embodiment may use for example, for the data structure 40, bits 5 through 12, represented herein as <12:5> as an index for addressing each entry of the data structure 40. Using bits <12:5> as an index translates into an L1 cache size of 256 (or 28) entries for the data structure 40. In addition, each entry or data block of the data structure 40 is 32 bytes in length. Furthermore, each byte segment of the data block is individually addressable. In the preferred embodiment however, the data may be selected in 4 byte increments.

The addressing of a particular byte (or word) of data in the L1 cache is accomplished using bits <4:0> of the address asserted on the bus. Since the data is always selected in 4 byte increments, bits 0 and 1 will always be de-asserted. It follows then that since three bits remain for selection, there are eight possible combinations or eight segments which can be addressed. For example, if the CPU asserted an address on the bus where bits 2 and 3 were set, the 4th 4 byte segment would be selected.

Bits <39:13>, known as the tag bits, are bits which are compared to values stored in the tag store portion of the cache. So, for example, if bits <12:5> evaluated to the value 2, and bits <39:13> evaluated to the value 3,000, a cache lookup would use bits <12:5>(value=2) to select the second entry in data structure 40. After selecting the second entry based on bits <12:5>, a comparison is done between bits <39:13> of the address asserted on the bus and the value stored in the tag store at index location 2. In this example, if bits <39:13> of the tag value evaluated to 3,000, there would be a match on the cache lookup. This match is known as a cache hit.

If, on the other hand, during a lookup in the L1 cache, bits <39:13>of the address asserted on the bus and the value in the tag store did not match, a cache miss would result. As the result of a cache miss in the L1 cache 22, the processor would then look to the L2 cache 24 in search of the required instruction or data item.

Figure 4:
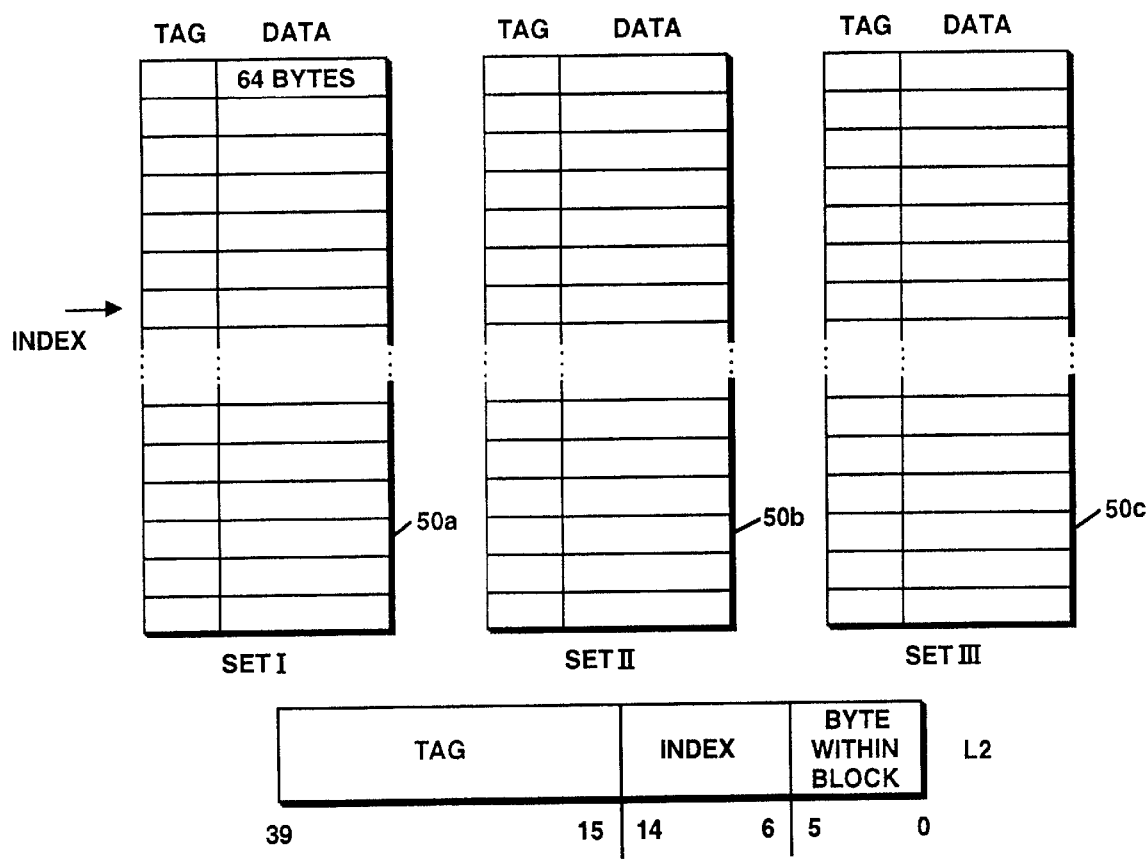
FIG. 4 is a representation of the data structures of a second level cache (L2) of the CPU in FIG. 2.

Referring now to FIG. 4, the L2 cache 24 is shown being represented by data structures 50a, 50b, and 50c which may be implemented in the integrated circuitry of CPU 12. Data structures 50a–50c represent a manner in which to organize the data associated with a so-called set associative cache design such as the L2 cache. With an associative cache such as the L2 cache, for each index value, there are multiple cache entries. In a preferred embodiment and as shown in FIG. 4, the L2 cache is a three-way set associative cache meaning that for a particular index value, there is the possibility of a cache hit in any one of the three sets or data structures 50a, 50b, or 50c. That is, for each index into the cache, there are three possible cache locations where the requested instruction or data item may be found.

Indexing or addressing into the L2 cache is accomplished in the same manner as described above for the L1 cache. However, since each data structure in the L2 cache contains more entries than the L1 cache 22, more bits of the address asserted will be needed to index into a particular cache location. Accordingly, this leaves fewer bits to be stored as tag bits in each cache location. Also shown in FIG. 4 is an example of an address asserted on the system bus for a memory access along with the bit groupings associated with a lookup in the L2 cache.

During a cache lookup to the L2 cache, the following procedure may be followed. First, as described above, a portion of the address asserted on the bus may be used to index into the cache. In this case, bits <14:6> are used as index bits into the cache. Using bits <14:6> permits the L2 cache to have 512 (or 2) discrete addressable entries. Bits <39:15> are tag bits may be used during the tag comparison once a particular set of entries is selected using the index bits. If an L2 cache lookup resulted in a hit, bits <5:0> could be used to select an individual byte within the block of data stored in the data structure. Since there are six bits used for this purpose, that indicates that there are 64 (26) possible bytes of data in each data block of each cache entry in each set. As described above for the L1 cache, data may be selected in 4 byte segments. Thus bits 0 and 1 may be de-asserted with the remaining bits <5:2> being used to select one of the 16 segments.

With a set associative cache as shown in FIG. 4, a single index may be used to simultaneously address three cache entries of 64 bytes of data. Once indexed, a comparison can be done, in parallel, between the tag bits of the address asserted on the bus and each of the tag store entries associated with the aforementioned index. The tag comparison is preferably performed by simultaneously comparing the tag bits of each set at the indexed location to the tag bits of the address asserted on the bus. In a properly operating cache, the comparison may result in at most one hit for one of the sets of the L2 cache data structures 50a–50c. A hit on a particular set within the L2 cache may be indicated by the assertion of a signal on a signal line (or hit wire, not shown) associated with one of the three sets. If however, the cache lookup resulted in a miss, the CPU would be required to perform a cache lookup in the L3 cache 32 in order to try to find the required data.

Figure 5:
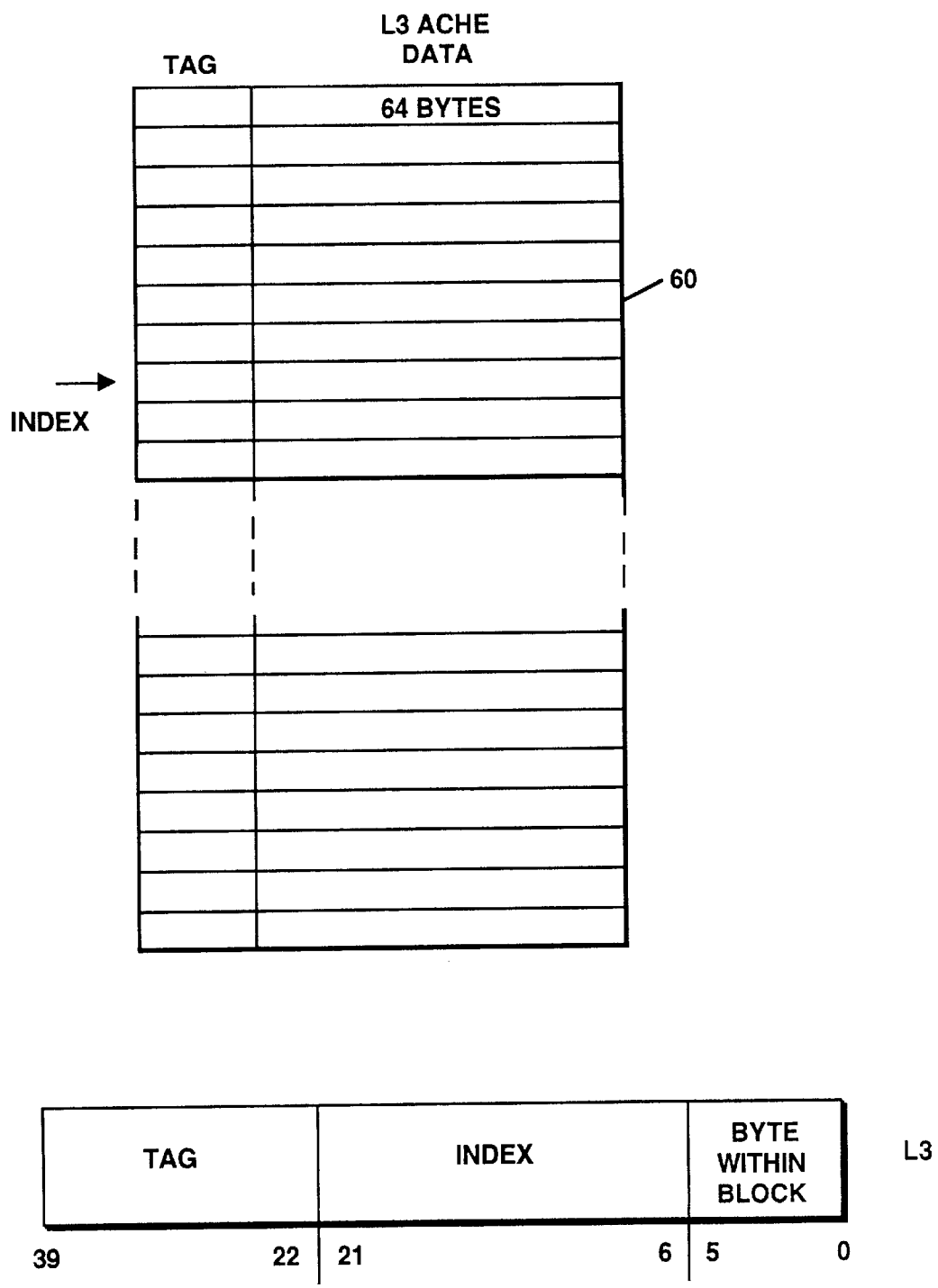
FIG. 5 is a representation of the data structure of a third level cache (L3) of the cache memory system of FIG. 2.

Referring now to FIG. 5, the L3 cache 32 shown being represented by data structure 60 which may be have a size of four megabytes. Data structure 60 includes 65,536 entries, each entry storing 64 bytes of data and having an associated tag. Like the L1 cache 24, L3 cache 32 uses a data structure 60 which is direct mapped. Although a direct mapped cache, the L3 cache 32 follows a write-back update protocol similar to the L2 cache 32.

Addressing a particular cache location within the L3 cache data structure 60 may be achieved as described above in connection with the data structure 40. That is, a certain set of bits of an address asserted on the bus may be used to provide an index into a single location in the data structure. As will be described below, since the L3 cache data structure 60 is preferably much larger than data structure 40 and contains many more entries than the data structure 40. Since more of the bits of address on the bus will be needed to index a particular location, it follows then that there are fewer bits remaining of the address on the bus to use during a tag store comparison.

Still referring to FIG. 5, in addition to data structure 60, an address which may be asserted on the system bus by CPU 12 is shown along with the associated bit groupings which may be used to access data structure 60. As described above, data structure 60 may be 4 Mb in size and contain over 65000 entries, and as such requires 16 bits of the address asserted on the bus (<21:6>) in order to uniquely index each entry. Consequently fewer bits remain for storage of tag information. In this case bits <39:22> may be used to compare against an equal number of bits stored in the tag portion of data structure 60. Like the L2 cache, each data entry in the L3 cache data structure 60 can store up to 64 bytes of data. Thus, also like the L2 cache, bits <5:0> may be used as described above to select individual 4 bytes segments of the stored data in data structure 60.

In accordance with the preferred embodiment of the present invention, data is moved into and out of the caches 22, 24, and 26 by the CPU 12 in order to achieve optimal performance of the computer system 10. Due to the hierarchical structure of the caches, it is often necessary to displace a data item at a particular cache location with a new or updated data item. For example, since the L3 cache 32 in the preferred embodiment is a 4 Mb cache with 65,536 indexable locations and the L2 cache 24 has 512 indexable locations, then at any give time, there are 128 possible locations of the L3 cache which may be stored in each entry of the L2 cache 24. This arrangement is readily apparent when examining the bit allocations for the L2 and L3 caches.

The L2 cache of the preferred embodiment uses bits <14:6> as index bits while the L3 cache uses bits <21:6> as index bits. Since there are seven additional upper order bits in the L3 cache index, it follows that there are 128 addresses ($2^7$=128) in the L3 cache which may have the same index (i.e. bits <14:6>) as a single entry in the L2 cache. These additional bits will normally be stored as part of the tag in the L2 cache. In actuality, since the L2 cache is a three way set associative cache having 3 entries for each index, any three of the possible 128 locations in the L3 cache may be stored in any indexed location of the L2 cache at any give time.

During operation of computer system 10, the CPU 12 will often seek to write data to memory. As described above, it is preferable to write the data to one of the caches if the address of the write command is represented in one of the caches. It follows therefore that the CPU will first look to the caches to determine if the address of the write command is presently stored in one of the caches. If each cache lookup results in a miss, then a read to main memory 14 will be initiated which causes the data from main memory, at the addresses of the write command, and the tag portion of the write command address to be placed in each of the caches at a location indexed by the write command address. This read is performed to insure that the correct main memory address is represented in the cache before the data associated with that address is modified by the write command.

Following the read from memory, the data associated with the write command will overwrite the data returned from memory according to the cache system update protocol. In the case of the cache system associated with computer system 10, since the L2 cache follows a write-back protocol, the data will not be copied to the L3 cache immediately.

At this point, the L2 and L3 caches will each have a corresponding addressable cache location referencing the same main memory address. However, both caches will not hold the same data. The L2 cache will contain the most recent (up to date version) data item. This situation is acceptable until a subsequent read or write command is issued by the CPU which will cause the data in the L3 cache to be evicted.

This situation occurs when the address of the new read or write command indexes a location in the L2 cache which results in a miss and also indexes the location in the L3 cache previously updated from main memory which also results in a miss. At this point the location in the L3 cache contains what is considered to be modified data due to the previous read and therefore must be copied back to main memory before being overwritten by the read command initiated as a result of the cache miss. However, this location in the L3 cache corresponds to a location in the L2 cache which contains more recent data. Therefore to ensure that the proper data is placed in main memory, the data from the L2 cache should be placed in main memory and not the data from the L3 cache.

In accordance with the present invention, during the initial read of the L2 cache, a Bcache index match is performed to determine whether the L2 cache contains more recent data than a location which will be evicted from the L3 cache in the event of a cache miss, as will now be described.

Figure 6:
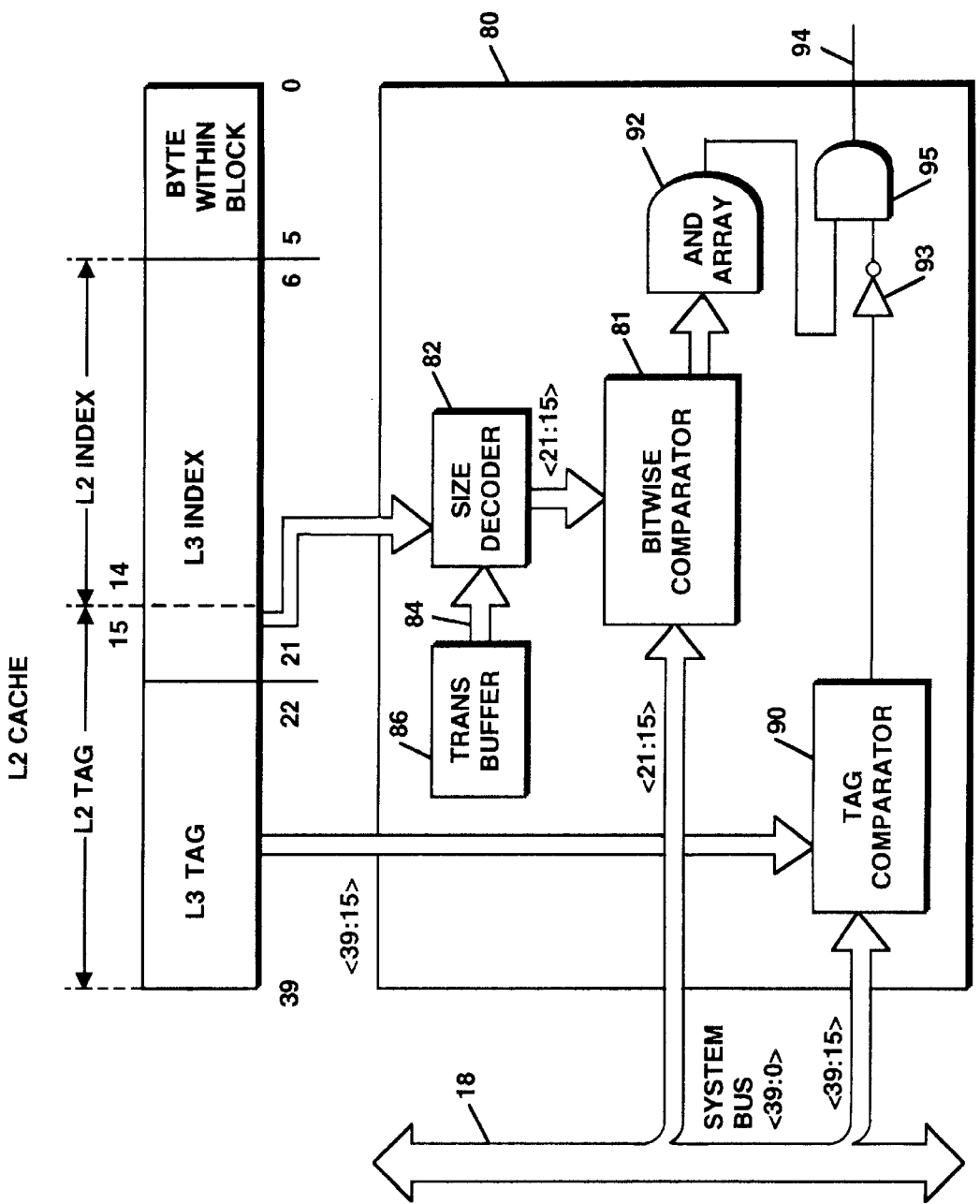
FIG. 6 is a block diagram of circuitry used to perform a cache index match.

Referring now to FIG. 6, Bcache index match logic 80 is provided to facilitate detection of the most recent version of a data block during an initial read of the L2 cache. Bcache index match logic 80 comprises a bitwise comparator 81, a size decoder 82, a translation buffer 86, a tag comparator 90, as well as an AND array 92, inverter 93, and gate 95. The bitwise comparator logic 81 is coupled to the address lines which make up the index bits of the L3 cache. Bitwise comparator logic 81 is also coupled to a portion of the tag bit signal lines of the L2 cache. In addition, Bcache index logic includes a size decoder 82 which couples the proper number of address lines to the bitwise comparator logic depending on the size of the L3 cache. Size decoder 82 receives as an input, the output of a translation buffer 86. The translation buffer asserts signals on the three input lines 84 of size decoder 82 depending on the size of the L3 cache. The value of the asserted bits determines how many of the L2 tag bits will be examined by the comparator logic 81 in order determine if L3 cache contains modified data at the indexed location. Here, translation buffer 84 includes eight entries to indicate L3 cache sizes of 1 Mb to 64 Mb.

As stated above, during a normal lookup of the L2 cache, bits <14:6> of the address asserted on the bus are used to locate an entry in the L2 cache while bits <39:15> are used during the tag compare to determine whether the lookup will result in a hit or a miss. According to a preferred embodiment of the present invention, during the initial lookup, comparator logic 81 is used to also compare a portion of the L2 tag bits stored at the indexed location to a portion of the address asserted on the bus. The L2 tag bits used during comparison are those bits required, when used in conjunction with the L2 index bits, to construct the index into the L3 cache. For example, during a lookup of the L2 cache, bits <14:6> may be used to index an entry and bits <39:15> are used as a tag compare to determine a cache hit or miss. While the L2 tag bits <39:15> are being compared to the address asserted on the bus via tag comparator 90, bits <21:15> of the L2 tag value are being separately compared to bits <21:15> of the address asserted on the bus by comparator logic 81. By determining that there is a match between bits <21:15> of the L2 tag bits and the corresponding bits of the address asserted on the bus, the present invention is able to determine that the data block stored in the L2 cache has the same L3 index value as the requested data (i.e. address asserted on the bus).

Furthermore, if the L2 lookup produced a cache miss, and the data stored at the location producing the cache miss is marked as dirty, the present invention detects a so called Bcache index match condition. Because of the subset rule described previously, it is known that each entry in the L2 cache should also be stored in the L3 cache. Now, since it has been determined that the index value of the L2 cache entry which produced a miss and is marked dirty, has the same L3 index value as the requested data (address asserted on the bus), the present invention is able to detect that the requested data is also not in the L3 cache (i.e. would also cause a miss) without actually looking in the L3 cache since the L3 cache should, if bits <21:15> match, contain the same data as the L2 cache entry which missed.

A Bcache index match will be detected by bitwise comparator 81 and tag comparator 90 in combination with AND array 92 and cause a signal to be asserted on signal line 94. This signal line is used as an indicator which will cause the contents of the L2 cache entry to be copied to the L3 cache before being updated.

As a result of the Bcache index match and in accordance with the cache update procedure, the data entry in the L2 cache will be written to the L3 cache entry indexed by the address asserted on the bus prior to the CPU performing an L3 cache lookup. Now, when the CPU performs a lookup of the L3 cache, it will again receive a cache miss indication (since this is the same information which was just in the L2 cache). Additionally, since the data in the L3 cache is marked dirty as it was in the L2 cache, it needs to be copied to main memory before being displaced by the data returned from memory as a result of the miss in the L3 cache. Thus, the data from the L3 cache (previously in the L2 cache) will be copied to memory (evicted) before being overwritten by the read command initiated as a result of the cache miss.

It can be seen then that by utilizing the Bcache index match, the most recent data (e.g. that in the L2 cache) is updated to memory thereby maintaining cache coherency. The most recent data in the L2 and L3 caches is found without actually searching each cache level.

It should be noted that rather than copy the most recent data to the L3 cache and then to main memory, the data in the L2 cache could be copied directly to memory. Copying the most recent data to main memory may however require additional hardware thus complicating the computer system design.

Having described a preferred embodiment of the invention, it will be apparent to one of skill in the art that changes to this embodiment and other embodiments may be used without departing from the principles and spirit of the invention, the scope of which is defined by the appended claims.

We claim:

1. A cache memory system for use with a computer system comprising:

a plurality of caches, each cache including a plurality of addressable storage locations for storing data and said plurality of caches arranged in a hierarchical fashion and said plurality of caches adhering to a subset rule;

means for comparing a portion of tag bits of an entry stored in a first one of said plurality of caches with address bits asserted on a bus, said portion of tag bits being associated with ones of said address bits needed to index a location in a second one of said plurality of caches; and means responsive to said comparing means for determining a most recent version of a data item stored in said first one of said plurality of caches during a lookup of said first one of said plurality of caches without a lookup of said second one of said plurality of caches;

means, responsive to said determining means for placing said most recent version of said data item in a main memory before replacing said data item with another data item.

2. The cache memory system of claim 1 further comprising:

means for indicating a match between said portion of tag bits and said address bits asserted on a bus;

means, responsive to said indicating means and a status of said entry, for indicating that said first one of said plurality of caches contains said most recent version of said data item.

3. The cache memory system of claim 2 further including:

means for selecting said portion of tag bits from said store entry based on a ratio of sizes between said one of said plurality and said other one of said plurality of caches.

4. The cache memory system of claim 2 wherein said status of said entry indicates that said entry contains a dirty data item.

5. A method of operating a cache memory including at least two caches with each cache containing a subset of data contained in a next cache, said method comprising the steps of:

decoding an address asserted on a computer to determine an index to an entry in a first one of said caches;

comparing all tag bits of said entry to corresponding bits of said address asserted on said computer bus to determine if there is a cache hit or cache miss;

comparing a portion of said tag bits of said entry to corresponding tag bits of said address asserted on said computer bus during a lookup of said first one of said caches, said portion of tag bits corresponding to additional bits which, when used in conjunction with said index to said entry in said first cache, form a second index to another entry in a second one of said caches; and copying in response to said second comparing step said data from said first cache to said second cache when said second comparing step results in a match and said data in said entry in said first cache is marked dirty.

* * * * *